June 20, 1939.  A. RIES  2,162,826

NECKTIE SMOOTHER AND STRETCHER

Filed July 12, 1938

Fig.6

Inventor
Adolf Ries
By
his Attorney

Patented June 20, 1939

2,162,826

UNITED STATES PATENT OFFICE 2,162,826

NECKTIE SMOOTHER AND STRETCHER

Adolf Ries, Frankfort-on-the-Main, Germany

Application July 12, 1938, Serial No. 218,818

2 Claims. (Cl. 223—65)

This invention relates to a necktie smoother and stretcher, comprising two tapering arms hingedly connected at their narrow ends and capable of being spread, and a device fixing the arms in different adjusted positions.

According to the invention an aperture with rack-like teeth is provided in the wide end of each arm. Over these apertures a slidable cap open at its ends engages and has guide pins, one near each end, which pins, when the cap is pressed inwards, engage in a gap between the teeth and thus lock the arms in any spread position. Thus, it is possible to adjust and to rigidly fix the necktie smoother and stretcher to any width, so that both the narrowest and also the widest necktie can be smoothed and stretched. To facilitate manipulation the cap has on its free side a bar-shaped reinforcement. The surfaces of the arms have groove-like depressions along their entire length designed to hold a moist substance which assists the smoothing of the stretched necktie.

Figure 1:
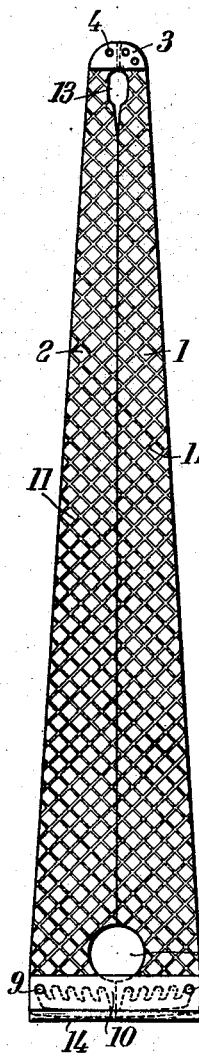
Figure 2:
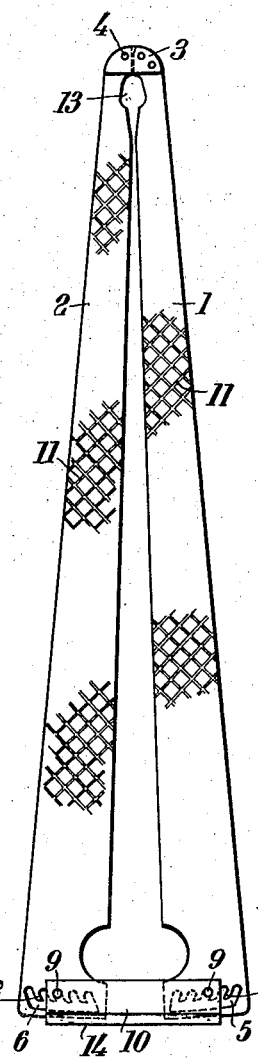
Figure 3:
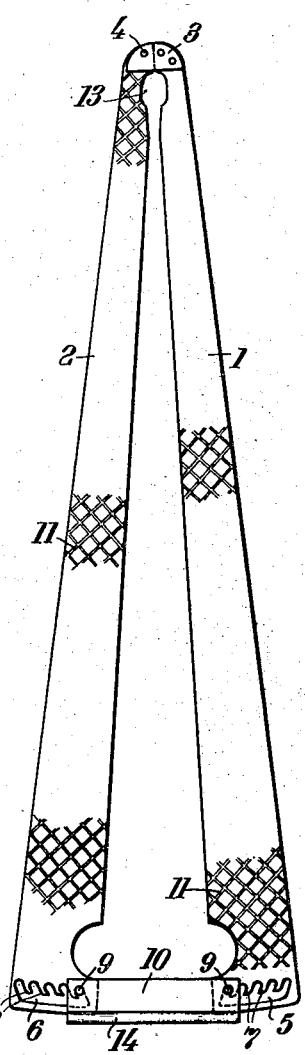
Figure 4:
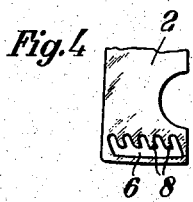
Figure 5:
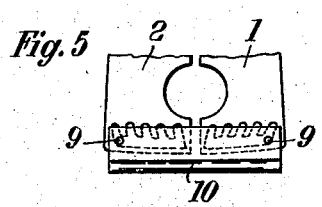

An embodiment of the invention is illustrated by way of example in the accompanying drawing, in which:

Fig. 1 shows in elevation the necktie smoother and stretcher in closed position, Fig. 2 is a similar view in partly spread position, Fig. 3 is a similar view in fully spread position, Fig. 4 shows the apertures with the teeth in the arms, Fig. 5 shows the portion of the cap of the necktie smoothing implement prepared for the stretching, Fig. 6 is a side elevation of the cap.

The necktie smoothing and stretching implement consists of two tapered arms 1 and 2, hingedly connected at their narrow ends. For this purpose a cap 3 is fixed on the arm 1 and the arm 2 is oscillatable about a pin 4. The arms 1 and 2 have at their wide ends apertures 5 and 6 respectively cut out to form teeth. The teeth 7, 8 have a curved guide surface which facilitates the engagement of guide pins 9 of a cap 10 (Fig. 6). The cap 10, open at both ends, is of a length equal to the width of the two arms 1 and 2 at the wide ends, grips over these wide ends and in locking position covers the apertures 5 and 6 (Fig. 1). In this position the two guide pins 9 are in a gap between two teeth in each of the apertures 5 and 6. To spread the arms 1 and 2 the cap 10 is pulled back on the wide ends of the arms so far that the guide pins 9 come out of engagement with the teeth and are in the open portion of the apertures 5, 6 with the result that the two arms can be spread as desired (Fig. 5). When these arms are spread as desired, the cap is pushed inwards over the arms until the pins 9 engage between the teeth and thus lock the arms of the necktie smoothing implement in the spread position (Figs. 2 and 3). The two arms 1 and 2 have intersecting grooves 11 on both sides on their entire surface, which grooves serve for receiving a moist substance which assists the smoothing of the necktie. Notches 12 and 13 form means for hanging the apparatus on a nail or the like.

The cap 10 has on its outer edge a bar-like reinforcement 14 which serves to facilitate the manipulation for sliding the cap.

The necktie smoother and stretcher may be made of metal or of suitable synthetic materials.

I claim:

1. A necktie smoother and stretcher, comprising in combination two arms each tapered toward one end hingedly connected at their narrow ends and having an aperture in each of their wide ends, teeth formed on the inner side of these apertures, a cap slidable on the wide ends of said arms, and pins one near each end of said cap adapted to engage the teeth in said apertures to lock said arms in any spread position.

2. A necktie smoother and stretcher as specified in claim 1, in which the cap is open at its two ends and has a bar-shaped reinforcement along its free side to facilitate its manipulation.

ADOLF RIES.